United States Patent
De' Longhi

(10) Patent No.: US 8,523,094 B2
(45) Date of Patent: Sep. 3, 2013

(54) METHOD FOR CONTROLLING A COFFEE MACHINE GRINDER

(75) Inventor: Giuseppe De' Longhi, Trevisio (IT)

(73) Assignee: De' Longhi S.p.A., Treviso (IT)

( * ) Notice: Subject to any disclaimer, the term of this patent is extended or adjusted under 35 U.S.C. 154(b) by 898 days.

(21) Appl. No.: 12/669,736

(22) PCT Filed: Jul. 2, 2008

(86) PCT No.: PCT/EP2008/005394
§ 371 (c)(1),
(2), (4) Date: Jan. 19, 2010

(87) PCT Pub. No.: WO2009/010190
PCT Pub. Date: Jan. 22, 2009

(65) Prior Publication Data
US 2010/0198413 A1  Aug. 5, 2010

(30) Foreign Application Priority Data
Jul. 18, 2007  (IT) .............................. MI2007A1442

(51) Int. Cl.
*B02C 25/00* (2006.01)
*B02C 21/00* (2006.01)
*B02C 23/00* (2006.01)
*B02C 2/04* (2006.01)

(52) U.S. Cl.
USPC ........................... 241/30; 241/259.3; 241/290

(58) Field of Classification Search
USPC ........................... 241/37, 30, 259.3, 290, 100
See application file for complete search history.

(56) References Cited

U.S. PATENT DOCUMENTS

| | | | |
|---|---|---|---|
| 4,767,632 A | | 8/1988 | Meier |
| 5,201,474 A | * | 4/1993 | Midden .......................... 241/100 |
| 5,307,733 A | * | 5/1994 | Enomoto .......................... 99/280 |
| 5,558,283 A | | 9/1996 | Fisher et al. |
| 5,645,230 A | | 7/1997 | Marogna et al. |
| 7,984,868 B2 | * | 7/2011 | Anson ......................... 241/261.2 |

FOREIGN PATENT DOCUMENTS
| | | |
|---|---|---|
| IT | 1163225 B | 4/1987 |
| IT | TO950246 A1 | 9/1996 |

* cited by examiner

*Primary Examiner* — Faye Francis
(74) *Attorney, Agent, or Firm* — Volpe and Koenig, P.C.

(57) ABSTRACT

A method is provided for controlling a coffee machine grinder, which includes measuring the actual value of physical quantity relating to the percolation process and modifying the ground coffee grain size at least for the next percolation so that a possible detected deviation between the actual value and a reference value for the physical quantity is compensated.

17 Claims, 1 Drawing Sheet

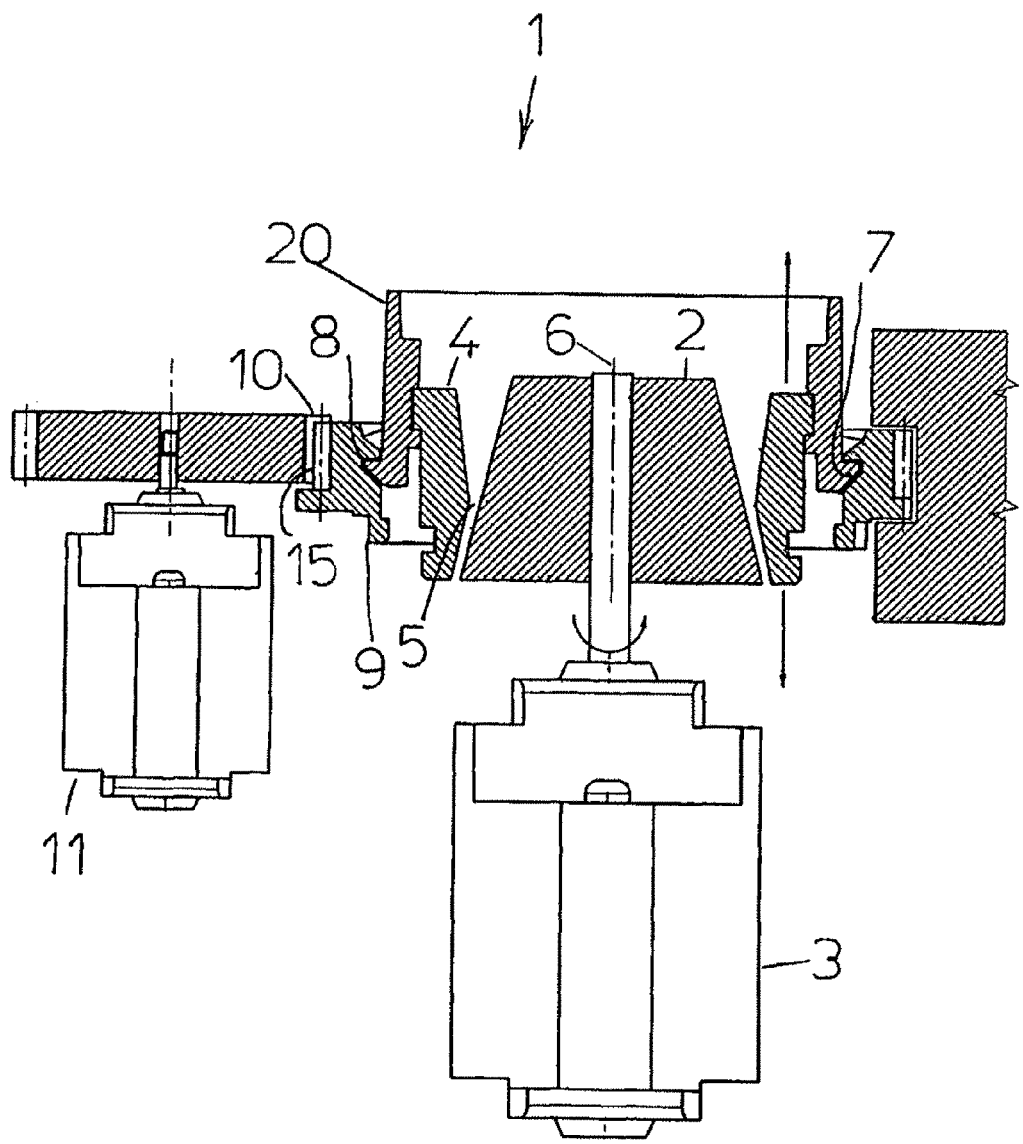

METHOD FOR CONTROLLING A COFFEE MACHINE GRINDER

The present invention relates to a method for controlling a coffee machine grinder.

The grain size of the coffee powder that is filled into the infusion chamber during the preparation of the beverage is one of the most important variables in determining the final result.

In fact, the grain size of the coffee power greatly affects the hydraulic conditions of percolation, determining the pressure drop of the percolation water and consequently the flow rate provided by the pump as well as the thermal behaviour of the boiler.

A finer grinding leads to an increased extraction of the substances contained in the coffee powder, thereby producing a beverage that is stronger and thicker and with a lot of froth produced, whereas a coarser grinding is more suitable for preparing coffee with a lower degree of extraction and with less froth.

Currently, the grain size is generally adjusted though purely mechanical means and is determined by the user by manually setting a ring nut for adjusting the gap between the grinding wheels.

Proper adjustment according to the user's taste is made difficult by the variability of many parameters depending, on the one hand, on the type of coffee used, in particular on the stock, the brand, the roasting, the moisture content thereof, and, on the other hand, on the grinder, in particular on the grinding system, on the mechanical settings at the end of the test run, on the wear of the grinding wheels, and on the amount of coffee introduced.

The technical task to be solved by the present invention is, therefore, to provide a coffee machine and a method for controlling a grinder of said machine that allow the technical drawbacks of the known art to be eliminated.

Within the scope of this technical task an object of the invention is to provide a method for controlling a coffee machine grinder that allows the gap between the grinding wheels, and therefore the grain size, to be automatically adjusted in order to obtain a beverage having the taste desired by the user.

A further, but not last object of the invention is to provide a method for controlling a coffee machine grinder that is simple but very effective.

The technical task as well as these and other objects according to the present invention are achieved by providing a method for controlling a coffee machine grinder according to claim 1.

Other characteristics of the present invention are further defined in the following claims.

Other characteristics and advantages of the invention will be clearer from the description of a preferred although not exclusive embodiment of the method for controlling a coffee machine grinder according to the finding, illustrated in an indicative and not limitative manner in the accompanying drawing, wherein:

FIG. 1 shows a schematic view of a coffee machine grinder that is controlled by a method in accordance with the present invention.

With reference to the cited figures, an automatic coffee machine grinder is shown, generally denoted by reference numeral 1.

The grinder 1 comprises an inner grinding wheel 2 and an outer grinding wheel 4 that are coaxial with respect to an axis 6 and delimit a gap 5, which determines the grain size, wherein grinding is carried out.

The inner grinding wheel 2 is rotationally actuatable around axis 6 by a first motor 3, while a gap 5 adjustment ring nut 9 is operatively engaged with the outer grinding wheel 4 to move the latter in translation parallel with axis 6 in order to be able to modify the width of gap 5 itself.

In particular, a tooth 7 projecting radially from the outer periphery of a supporting cup 20 of the outer grinding wheel 4 engages a cam profile 8 provided along the inner side wall of the adjustment ring nut 9 that, in turn, has an outer serration 15 meshing with a gear wheel 10 carried by the shaft of a second motor 11 to be driven in rotation around axis 6.

One of the grinding wheels, in particular the inner one 2, is further equipped with a clutch (not shown) intended to detach it from the motor 3 when a rolling friction moment is created between the grinding wheels blocking their reciprocal rotation.

The block for the reciprocal rotation between the grinding wheels may be caused by little stones and coconut skin and other impurities in the coffee to be grinded.

The control of the grinder 1 comprises one step of measuring of a physical quantity relating to the percolation process and one step of modifying the ground coffee grain size at least for the next percolation so that a possible detected deviation between the actual value and a reference value for the physical quantity is compensated.

Such a physical quantity can be preferably percolation rate, or percolation time, or hydraulic pressure in the percolation circuit.

The reference value for the physical quantity can be a fixed and unchangeable parameter stored in the control unit of the machine or it can be set freely by the user through a dedicated control (such as a knob or a button preferably located on the coffee machine panel) connected to the control unit of the coffee machine.

In order to carry out the above-mentioned method the coffee machine has within its hydraulic circuit measuring means for measuring the physical quantity relating to the percolation process, connected to the coffee machine control unit in which a percolation rate adjustment algorithm is stored.

If the physical quantity is the percolation rate, the measuring means comprise a flow meter; if the physical quantity is the percolation time, the measuring means comprise a chronograph; and if the physical quantity is the hydraulic pressure, the measuring means comprise a pressure sensor.

This algorithm controls the adjustment ring nut 9 through the actuation of the second motor 11 that is preferably an electric motor.

In the case in which the reference rate is not a parameter modifiable by the user, the latter only needs to order the production of the beverage by the machine possibly changing the amount of coffee powder should the number of doses to be produced or the taste change.

In the case in which the reference rate is a parameter modifiable by the user, instead, the latter possibly selects through the dedicated control also the body of the desired coffee.

This user's selection corresponds to the choice of one from the reference percolation rate values stored in the control unit which is thus taken into account by the calculation algorithm as a term for comparison.

If the user changes the settings (coffee powder amount and/or, if possible, coffee body) the control unit commands the execution of a preliminary coarse adjustment of the gap between grinding wheels by actuating the adjustment ring nut in order to have a preset and experimentally determined correction (for example the gap between the grinding wheels is modified according to a predetermined widening parameter when the coffee powder amount is increased).

The grinder performs grinding and thereafter initiates percolation.

Suppose now only as an example that the physical quantity is percolation rate.

The control unit measures the actual percolation rate.

For example, the system measures, at preset time intervals, the number of pulses read by the flow meter during supply and calculates an average thereof.

The algorithm makes a comparison between the measured actual percolation rate and the reference percolation rate.

If the measured actual percolation rate differs from the reference percolation rate, the algorithm commands the rotation of the adjustment ring nut 9 to increase or reduce, depending on the case, the gap 5 between grinding wheels 2 and 4 and consequently the subsequent grain size of coffee powder.

In particular, the algorithm commands that an activation pulse of the second motor 11 is sent. The rotation of the adjustment ring nut 9 is related to the activation time of the second motor 11.

If the measured actual percolation rate is correct, that is if within certain tolerances there is no deviation between the actual percolation rate and the reference percolation rate, the algorithm does not proceed to the correction of the grinding parameters.

Preferably, the rotation of adjustment ring nut 9 should occur during the initiation of the next grinding such that its motion mechanism is not forced.

Since the current relative position between grinding wheels 2 and 4 (and accordingly the width of gap 5) is not an input data for the algorithm, the system proceeds to rotationally actuate adjustment ring nut 9 with small successive rotation steps in subsequent grindings until the measured actual percolation rate and the reference percolation rate are matched. If need be, it is possible to keep in memory at least the two last values for the measured actual percolation rate to make the adjustment mechanism more precise.

Alternatively the control system can have means for detecting the relative current position between grinding wheels 2 and 4, and accordingly the current gap 5 width, and use the resulting readout as input data for the algorithm in order to improve precision in actuating the adjustment ring nut 9 itself.

In the specific case in which the detection of the current relative position between grinding wheels 2 and 4 is made by reading the current angular position of adjustment ring nut 9, a position encoder with closed-loop control can be suitably used or also a stepper motor with open-loop control.

Detection of the relative current position between grinding wheels 2 and 4 can be effected in different ways, for example through a laser system, a strain gage, a capacitive sensor, a potentiometer etc.

In the case in which the control system is able to read the current relative position between grinding wheels 2 and 4, there is the advantage of a precise and faster adjustment in that it is goes in the direction of a correction close to that which is necessary.

It has to be noted that advantageously when such a rolling friction moment is created between the grinding wheels to block their reciprocal rotation so as the clutch detaches the grinding wheel 2 from motor 3, an activation signal is automatically generated for activation of the actuating means of the adjustment ring nut to widen the gap between the grinding wheels so as to remove the source of the block.

The method for controlling a coffee machine grinder thus conceived is susceptible of many modifications and variations, all of which fall within the scope of the inventive concept; moreover all details can be replaced by technically equivalent elements.

In practice, the materials used, as well as dimensions, can be any according to the particular requirements and the state of the art.

The invention claimed is:

1. A method for controlling a coffee machine grinder comprising measuring an actual value of a physical quantity relating to a percolation process and modifying a ground coffee grain size at least for the subsequent percolation so as to compensate for a possible detected deviation between said actual value and a reference value for said physical quantity, wherein as a consequence of user changes for the coffee machine, the control unit commands the execution of a preliminary coarse adjustment of a gap between grinding wheels by actuating an adjustment ring nut, and wherein when a rolling friction moment is created between the grinding wheels to block their reciprocal rotation, an activation signal is automatically generated for activation of an actuator of the adjustment ring nut to widen the gap between the grinding wheels so as to remove the source of the block.

2. The method for controlling a coffee machine grinder according to claim 1, wherein said physical quantity is the percolation rate.

3. The method for controlling a coffee machine grinder according to claim 1, wherein said physical quantity is the percolation time.

4. The method for controlling a coffee machine grinder according to claim 1, wherein said physical quantity is the percolation hydraulic pressure.

5. The method for controlling a coffee machine grinder according to claim 2, wherein said reference percolation rate is a fixed operational parameter that cannot be set by the user.

6. The method for controlling a coffee machine grinder according to claim 2, wherein said reference percolation rate can be set by the user.

7. The method for controlling a coffee machine grinder according to claim 1, wherein said deviation is compensated for through an algorithm which, based on said detected deviation, automatically commands a related rotation for the gap adjustment ring nut between the grinding wheels of said grinder.

8. The method for controlling a coffee machine grinder according to claim 7, wherein rotation of said adjustment ring nut is performed at the beginning of at least one subsequent grinding for carrying out said at least one subsequent percolation.

9. The method for controlling a coffee machine grinder according to claim 7, wherein rotation of said adjustment ring nut is divided into a sequence of small rotation steps performed for several successive grindings.

10. The method for controlling a coffee machine grinder according to claim 7, wherein a current relative position between the grinding wheels of said grinder is read and said readout is used as input data for said algorithm in order to improve the precision of said rotation of said adjustment ring nut.

11. The method for controlling a coffee machine grinder according to claim 7, wherein said algorithm commands said rotation of said adjustment ring nut without using as input data the readout of the current relative position between the grinding wheels of said grinder.

12. The method for controlling a coffee machine grinder according to claim 7, wherein said rotation of said adjustment ring nut is automatically performed by a change in the setting of at least one of said reference value or a coffee powder amount.

13. A coffee machine comprising a grinder having an actuator for actuating a grinding wheel gap adjustment ring nut of said grinder, driven by an algorithm that compares an actual value for a physical quantity relating to a percolation process, measured by suitable measuring device, with a reference value for said physical quantity, and modifies a ground coffee grain size at least for a subsequent percolation so as to compensate for a possible detected deviation between said actual value and said reference value of said physical quantity, wherein a control unit is responsive to user changes for coffee machine settings to command the execution of a preliminary coarse adjustment of a gap between grinding wheels by actuating an adjustment ring nut, and wherein the measuring device comprises a pressure sensor placed in a hydraulic circuit of the coffee machine.

14. The coffee machine according to claim 13, wherein said measuring device comprises a flow meter placed in a hydraulic circuit of said machine.

15. The coffee machine according claim 13, wherein said measuring device comprises a percolation timer.

16. The coffee machine according to claim 13 further comprising a detector that detects a current relative position between the grinding wheels of said grinder, in communication with a control unit of said coffee machine to improve control precision performed by an algorithm.

17. The coffee machine according to claim 16, wherein said detector comprises a potentiometer or a position encoder or a strain gage.

* * * * *